United States Patent
Seo

[11] Patent Number: 5,983,832
[45] Date of Patent: Nov. 16, 1999

[54] CAT LITTER BOX WITH BAG SYSTEM

[76] Inventor: Eun Sook Seo, 2968 Second St., Winchester, Va. 22601

[21] Appl. No.: 09/037,593
[22] Filed: Mar. 10, 1998
[51] Int. Cl.[6] .................................................. A01K 29/00
[52] U.S. Cl. ........................... 119/170; 119/166; 119/167
[58] Field of Search ............................. 119/165–170, 61

[56] References Cited

U.S. PATENT DOCUMENTS

| | | | |
|---|---|---|---|
| 3,771,493 | 11/1973 | Chandor | 119/170 |
| 3,831,557 | 8/1974 | Elesh | 119/170 |
| 4,813,374 | 3/1989 | Sides | 119/170 |
| 5,038,721 | 8/1991 | Ouellette et al. | 119/167 |
| 5,488,929 | 2/1996 | Pierson et al. | 119/170 |
| 5,551,376 | 9/1996 | Lundeen et al. | 119/167 |
| 5,709,167 | 1/1998 | Kelley | 119/61 |
| 5,709,171 | 1/1998 | Moore, III | 119/170 |
| 5,758,601 | 6/1998 | Dickson | 119/170 |

Primary Examiner—Peter M. Poon
Assistant Examiner—Judith A. Nelson
Attorney, Agent, or Firm—Michael I. Kroll

[57] ABSTRACT

A cat litter box with bag system (10) comprising a pan (12). A litter disposal bag (14) is nested into the pan (12). A plurality of feces disposal bags (16) are nested into the pan (12) over the litter disposal bag (14). A protective insert (18) having an open bottom is nested into the pan (12) over the uppermost feces disposal bag (16). When a quantity of litter (20) is placed into the pan (12) and used by a cat (22) to deposit feces (24), the protective insert (18) can be withdrawn and each feces disposal bag (16) can be removed one at a time as needed to separate the feces (24) from the litter (20), then tied and discarded. When the litter disposal bag (14) is reached and withdrawn it will take all of the litter (20) out of the pan (12) to be discarded.

4 Claims, 6 Drawing Sheets

CAT LITTER BOX WITH BAG SYSTEM

BACKGROUND OF THE INVENTION

1. Field of the Invention

The instant invention relates generally to sanitary receptacles for pets and more specifically it relates to a cat litter box with bag system. The cat litter box with bag system includes a plurality of feces disposal bags nested therein under the litter in a pan. Each feces disposal bag when removed therefrom will separate the feces from the litter for convenient discarding. A litter disposal bag is nested under the feces disposal bags, so that when reached and withdrawn it will take all of the litter out of the pan, allowing a fresh quantity of litter to be replaced into the pan.

2. Description of the Prior Art

Numerous sanitary receptacles for pets have been provided in prior art. For example, U.S. Pat. Nos. 4,359,966 to Casino; 4,884,526 to Giannakopoulos; 5,488,929 to Pierson et al. and 5,673,648 to Ayle all are illustrative of such prior art. While these units may be suitable for the particular purpose to which they address, they would not be as suitable for the purposes of the present invention as heretofore described.

CASINO, ALAN A.

ANIMAL LITTER DEVICE

U.S. Pat. No. 4,359,966

An animal litter device is disclosed herein for use in combination with a litter box having a quantity of sand or other filler material. The device includes a screen having a plurality of pyramid shaped elements upwardly projecting from and integrally formed with a base. The pyramid elements are arranged in parallel rows and columns and an opening or hole is provided in the base at the corner juncture of each and every pyramid elements with adjacent pyramid elements. A pair of handles are carried on opposite ends of the base and deodorant bars are carried on the handles.

GIANNAKOPOULOS, CIDELL M.

DISPOSABLE KITTY LITTER BOX AND BAG COMBINATION

U.S. Pat. No. 4,884,526

A disposable kitty litter box and bag assembly in which the box with litter is inside the bag. The bag wall is long enough to be gathered together at the top and tied shut with the box and used kitty litter closed inside. The entire assembly is then disposed of together as a unit. The part of the bag wall which extends upwardly beyond the wall of the box inside is doubled back in folds and held in place by a band or other releasable retaining device until the litter has been used and the entire assembly is ready for disposal. At such time, the band is removed or separated to allow the folds of the bag wall to be unfolded and lifted above the box and litter for closing and tying shut.

PIERSON, SUSAN K.

PIERSON, STACY S.

DISPOSABLE CAT LITTER BOX LINER

U.S. Pat. No. 5,488,929

A disposable cat litter box liner formed of flexible sheet material, preferably paper, is adapted to assume a generally flat configuration prior to use, a generally box-shaped configuration upon insertion into a cat litter box for holding litter therein, and a generally bag-shaped configuration upon removal from the litter box for disposing of the litter therein. The liner includes an arrangement of fold lines associated with the end panels for permitting the liner to be folded into a generally flat configuration prior to use. The liner includes a pair of elongate opposite top panels, which can advantageously include handles to facilitate lifting of the liner. When the top panels are clasped together and the liner lifted thereby with cat litter in the receptacle, the bottom panel collapses downward, the side panels collapse inward, and the liner assumes a generally bag-shaped configuration for disposal of cat litter therein.

AYLE, EARL F.

ANIMAL LITTER BOX AND STORAGE DEVICE

U.S. Pat. No. 5,673,648

An animal litter and storage box device is presented which allows an operator to clean all solid animal waste from litter material with a simple two step motion. The operator has no contact with the animal waste and there are no substantial moving parts or complex motion patterns that are required to operate the device. The device includes a bottom tray, a cover member having a waste chute which fits over the bottom tray, and a slide rail separator contained within the device that is capable of separating animal waste from litter material. The animal waste and litter material mixture is moved through the slide rail separator by lifting one end of the device. The solid animal waste is separated by the slide rail separator and rolls into a waste storage bag attached to the waste chute. The reusable litter which passes through the slide rail separator is contained within the device. The device is lifted again to redistribute the cleaned litter. When the waste storage bag receives solid animal waste, the top of the waste storage bag closes thereby trapping the animal waste, and odors associated with the waste, in the bag.

SUMMARY OF THE INVENTION

A primary object of the present invention is to provide a cat litter box with bag system that will overcome the shortcomings of the prior art devices.

Another object is to provide a cat litter box with bag system which includes a plurality of feces disposal bags nested therein under the litter in a pan, so that each feces disposal bag when removed therefrom will separate the feces from the litter for convenient discarding.

An additional object is to provide a cat litter box with bag system which includes a litter disposal bag nested under the feces disposal bags, so that when reached and withdrawn it will take all of the litter out of the pan, allowing a fresh quantity of litter to be replaced into the pan.

A still additional object is to provide a cat litter box with bag system that will keep the pan clean and free of caked build-up, as well as the protective insert will protect the walls of the bag system.

A further object is to provide a cat litter box with bag system that is simple and easy to use.

A still further object is to provide a cat litter box with bag system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
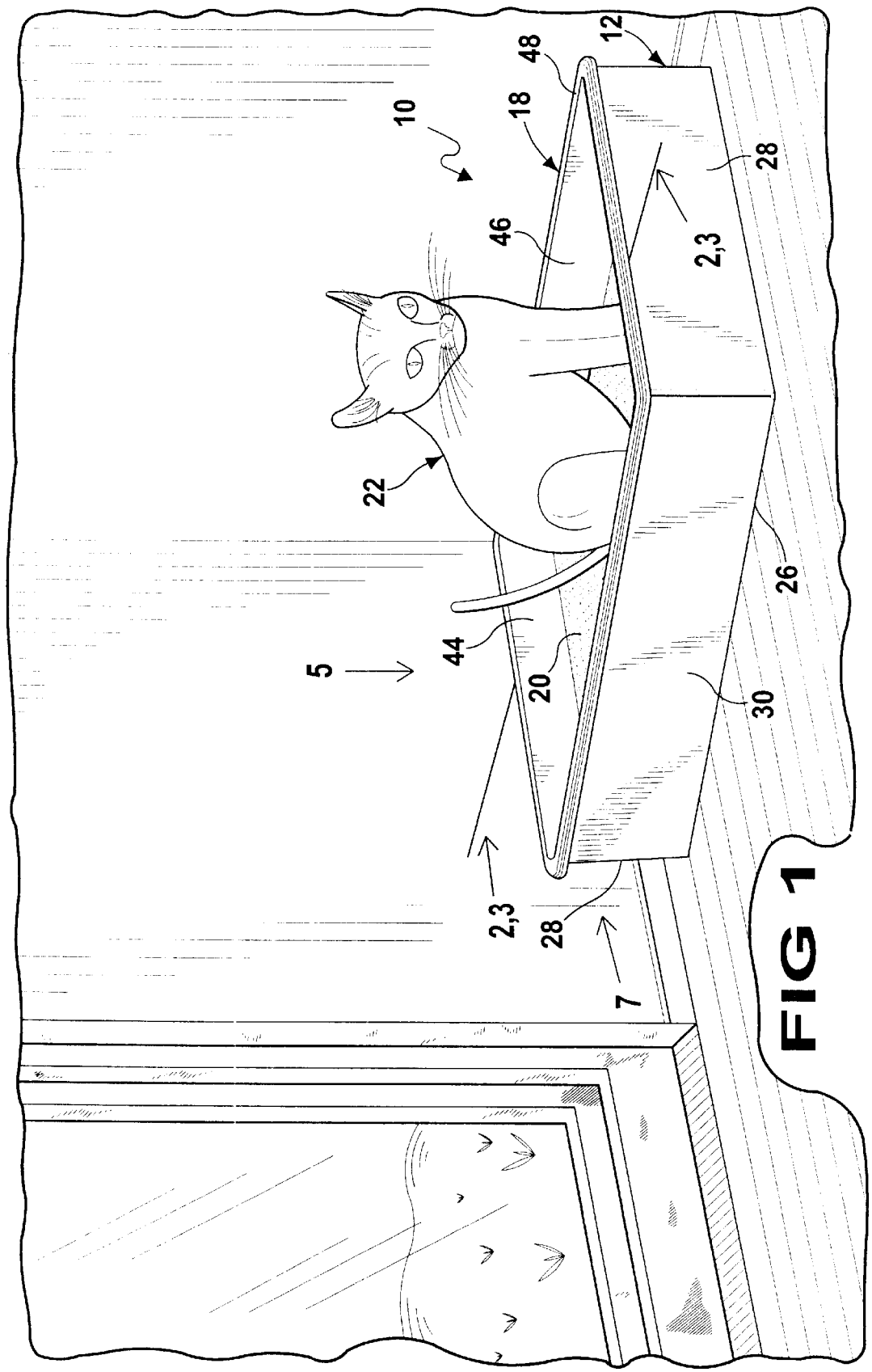
FIG. 1 is a perspective view of the present invention in use.
Figure 2:
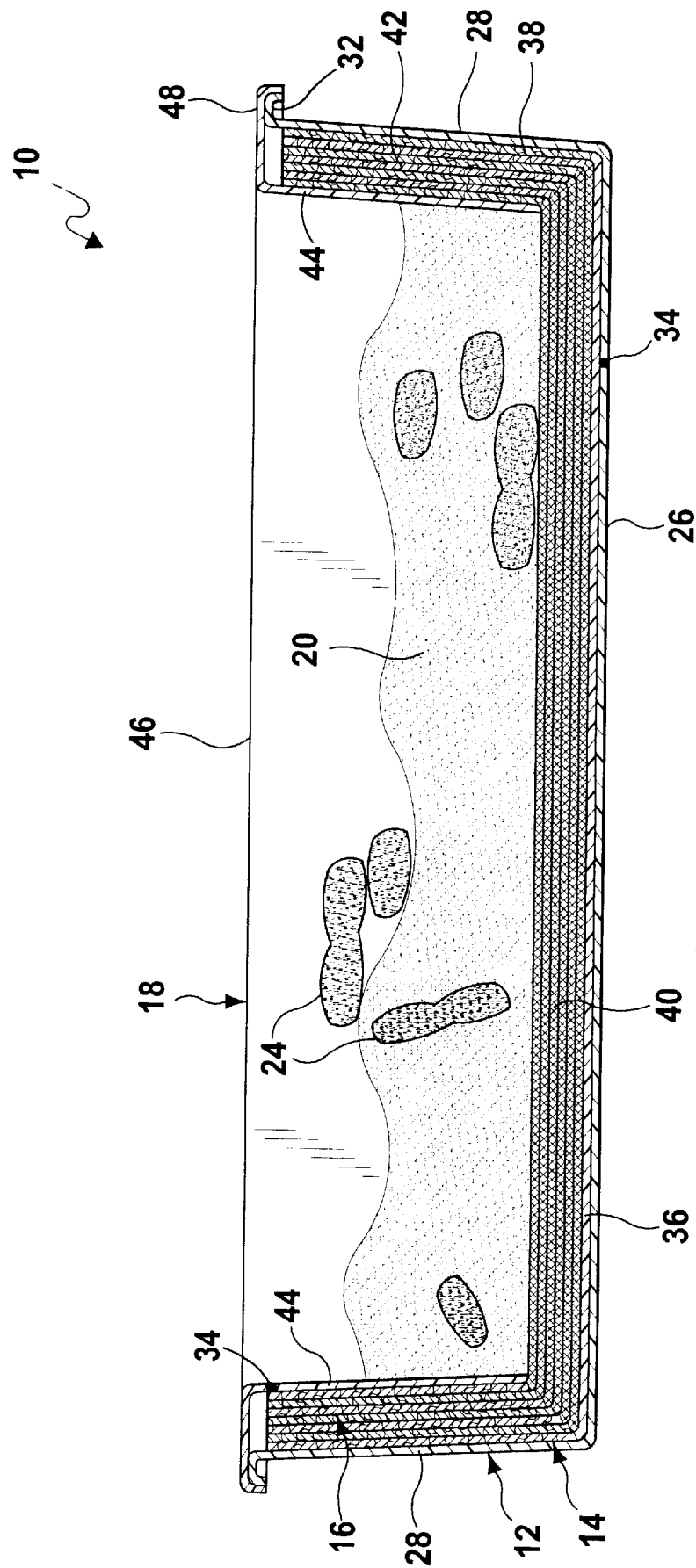
FIG. 2 is a cross sectional view taken along line 2, 3 in FIG. 1.
Figure 3:
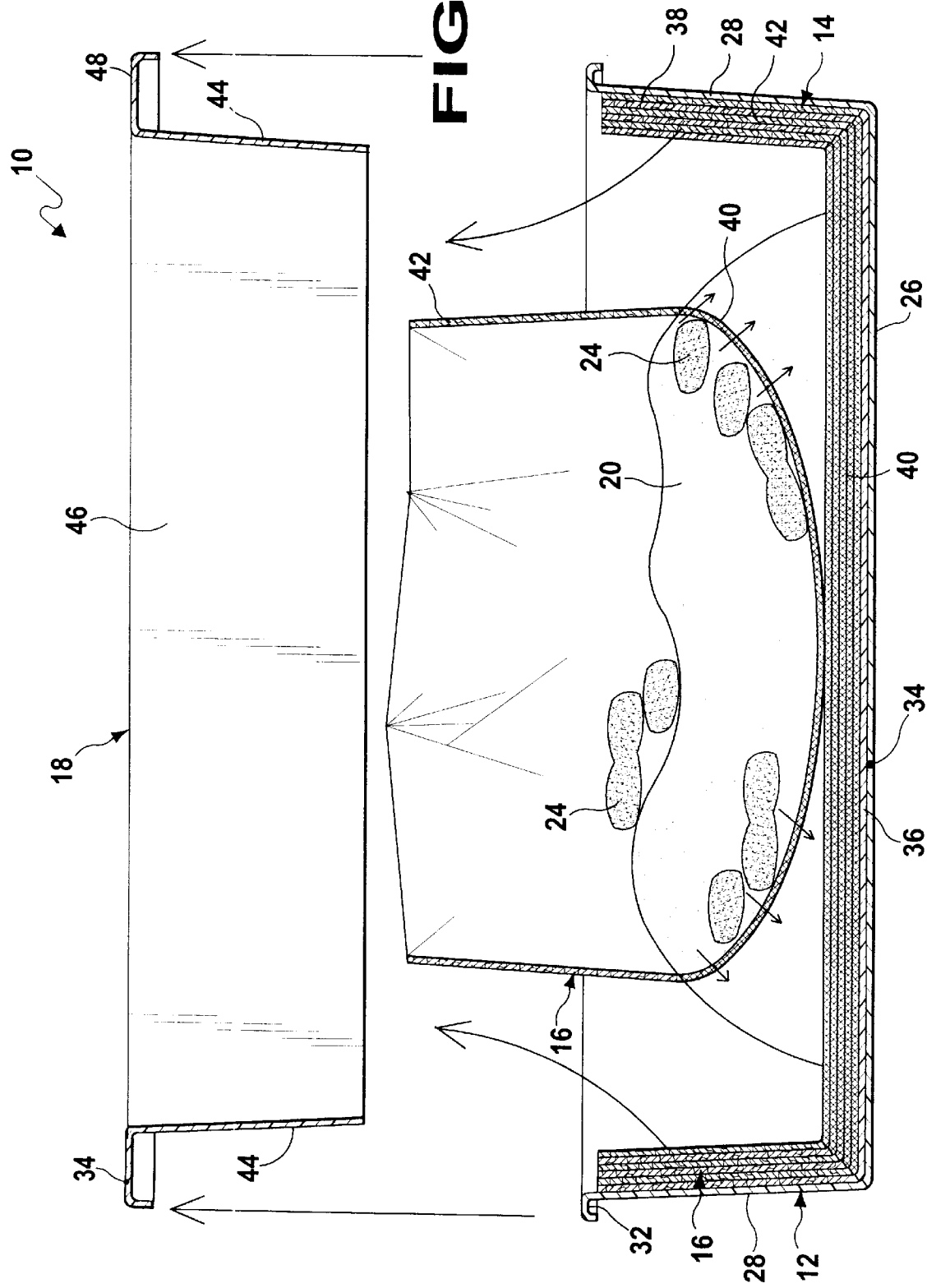
FIG. 3 is a partially exploded cross sectional view taken along line 2,3 in FIG. 1, showing the first feces disposal bag ready to be lifted, so as to remove the feces from the litter.

Turning now descriptively to the drawings, in which similar reference characters denote similar elements throughout the several views, FIGS. 1 through 3 illustrate the present invention being a cat litter box with bag system 10. With regard to the reference numerals used, the following numbering is used throughout the various drawing figures.

10 cat litter box with bag system
12 pan of 10
14 litter disposal bag of 10
16 feces disposal bag of 10
18 protective insert of 10
20 litter in 12
22 cat
24 feces of 22
26 bottom wall of 12
28 end wall of 12
30 side wall of 12
32 lip of 12
34 rigid plastic material for 12
36 solid thin flexible bottom wall of 14
38 paper peripheral wall of 14
40 netting bottom wall of 16
42 paper peripheral wall of 16
44 end panel of 18
46 side panel of 18
48 lip of 18
50 corner between 44 and 46
52 lower slot in 50

Figure 4:
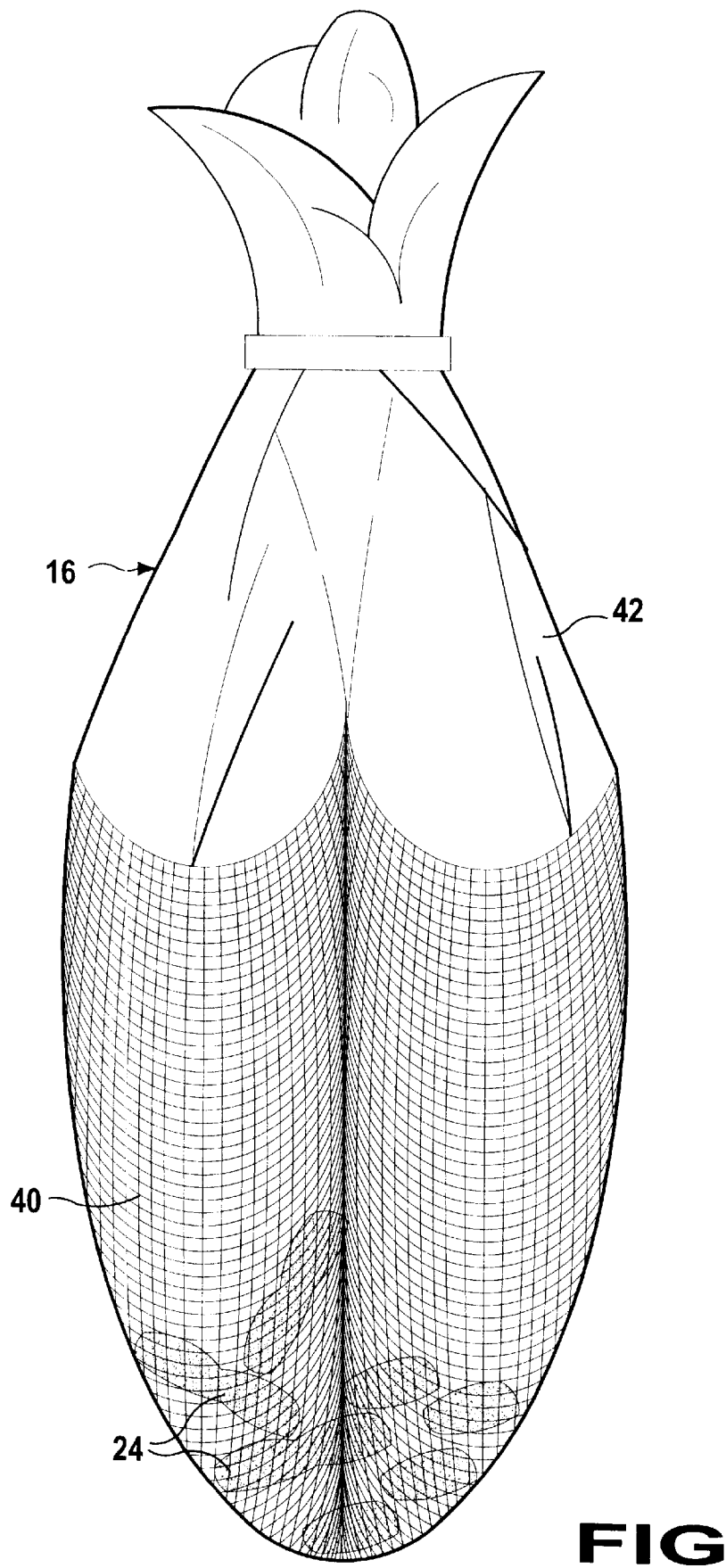
FIG. 4 is a perspective view showing the first feces disposal bag tied with the feces therein, so that the feces can be discarded.

The cat litter box with bag system 10 comprises a pan 12. A litter disposal bag 14 is nested into the pan 12. A plurality of feces disposal bags 16 are nested into the pan 12 over the litter disposal bag 14. A protective insert 18 having an open bottom is nested into the pan 12 over the uppermost feces disposal bag 16. When a quantity of litter 20 is placted into the pan 12 and used by a cat 22 to deposit feces 24, th protective insert 18 can be withdrawn and each feces disposal bag 16 can be removed one at a time as needed to separate the feces 24 from the litter 20, then tied and discarded (see FIG. 4). When the litter disposal bag 14 is reached an withdrawn it will take all of the litter 20 out of the pan 12 to be discarded.

Figure 5:
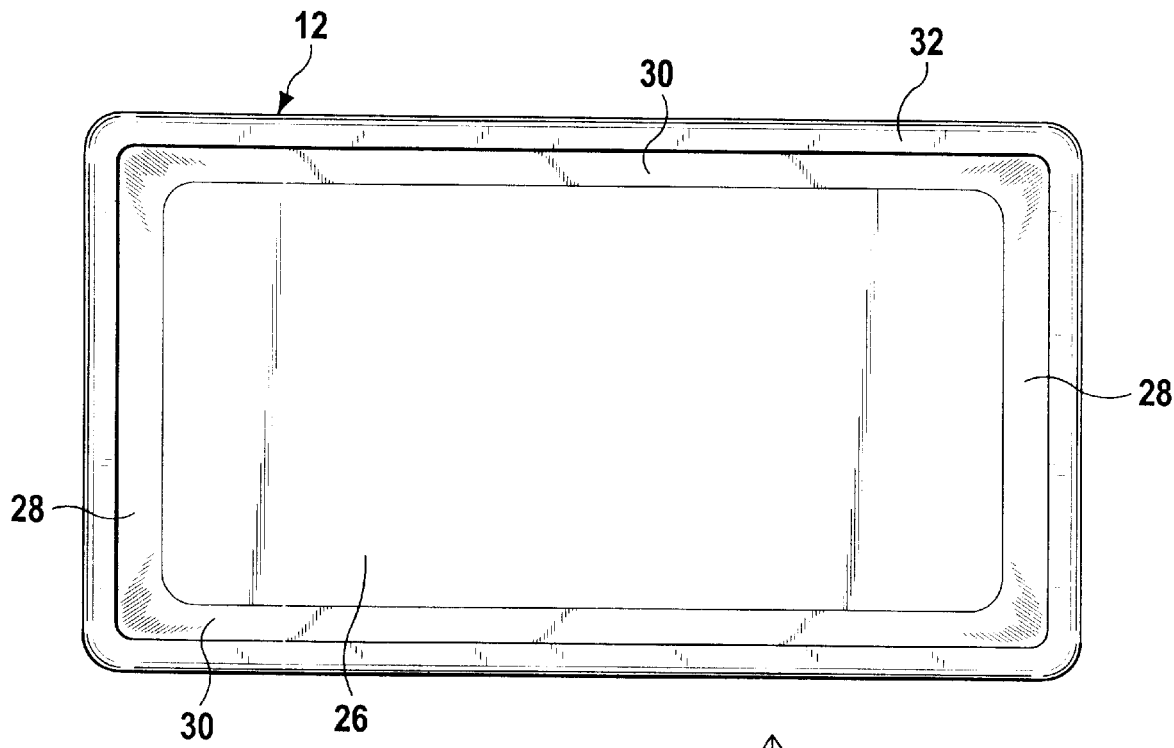
FIG. 5 is a top plan view of the pan taken in the direction of arrow 5 in FIG. 1.
Figure 6:
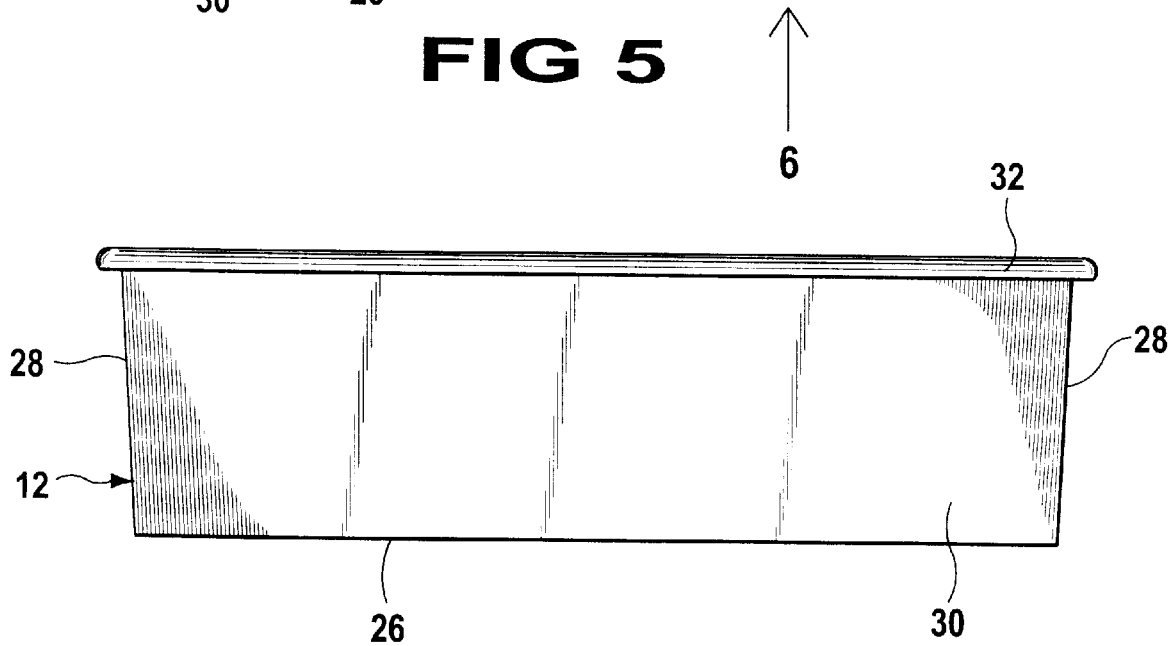
FIG. 6 is a front elevational view of the pan taken in the direction of arrow 6 in FIG. 5.

The pan 12, as best seen in FIGS. 5 and 6, includes a bottom wall 26. A pair of opposite end walls 28 extend upwardly from the bottom wall 26. A pair of opposite side walls 30 extend upwardly from the bottom wall 26.

A lip 32 extends around a perimeter of a top edge of the end walls 28 and the side walls 30. The pan 12 is fabricated out of a rigid plastic material 34.

The litter disposal bag 14 comprises a solid thin flexible bottom wall 36 to hold the litter 20 therein and a paper peripheral wall 38. Each feces disposal bag 16 contains a netting bottom wall 40, to allow the litter 20 to pass therethrough while trapping the feces 24 therein and a paper peripheral wall 42.

Figure 7:
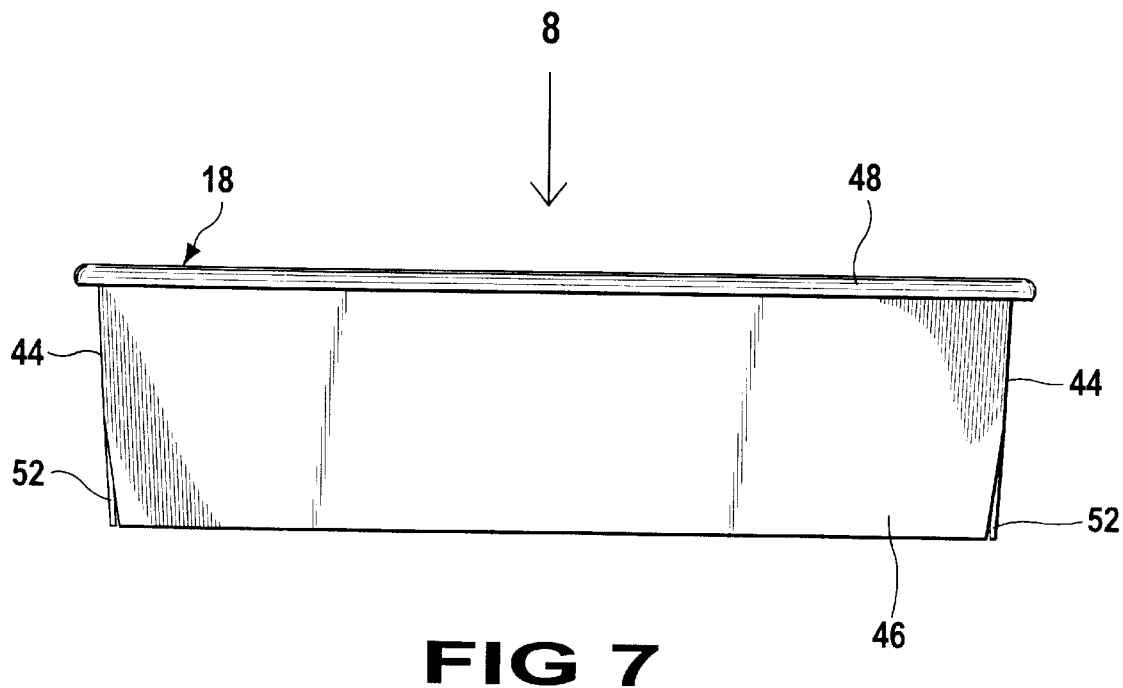
FIG. 7 is a front elevational view of the protective insert taken in the direction of arrow 7 in FIG. 1.
Figure 8:
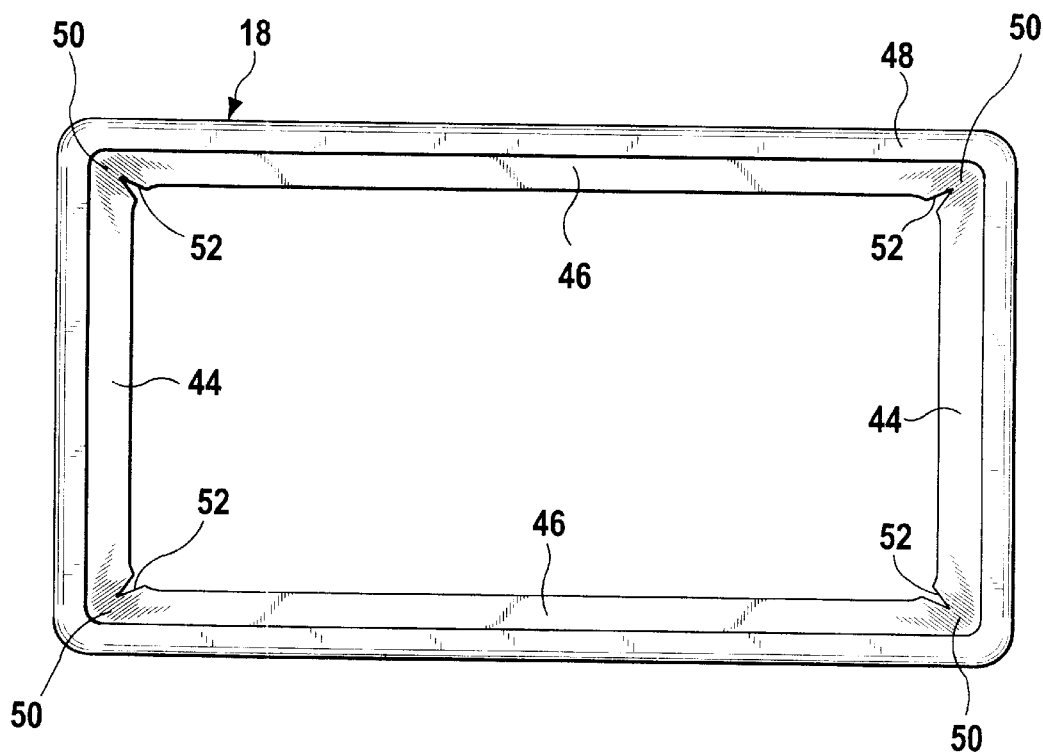
FIG. 8 is a t op pla n view of the protective insert taken in the direction of arrow 8 in FIG. 7.

The protective insert 18, as best seen in FIGS. 7 and 8, consists of a pair of opposite end panels 44 and a pair of opposite side panels 46, so as to cover and protect the sides of the nested litter disposal bag 14 and the sides of the feces disposal bags 16 from the cat 22. A lip 48 extends around a perimeter of a top edge of the end panels 44 and the side panels 46.

Each corner 50 of each end panel 44 which meets with each side panel 46 has a lower slot 52 therebetween, so that the end panels 44 and the side panels 46 can flex inwardly for ease of insertion into the inner part of the feces disposal bags 16 nested into the pan 12. The protective insert 18 is fabricated out of the rigid plastic material 34, to provide protection to the sides of the feces disposal bags 16.

OPERATION OF THE INVENTION

To use the cat litter box with bag system 10, the following steps should be taken:

1. Insert the feces disposal bags 16 and the litter disposal bag 14 as one unit into the pan 12 in their nested positions.
2. Insert the protective insert 18 into the pan 12 over the uppermost feces disposal bag 16.
3. Four a quantity of litter 20 into the pan 12.
4. Remove the protective insert 18 after the cat 22 deposits feces 24 into the litter 20.
5. Lift up the uppermost feces disposal bag 16 by its paper peripheral wall 42, so that the litter 20 will fall through the netting bottom wall 40 back into the pan 12, while the feces 24 is trapped.
6. Tie and then discard the feces disposal bag 16.
7. Repeat steps 5 to 7 when needed, until all of the feces disposal bags 16 are used.
8. Lift up the litter disposal bag 14, so as to take all of the litter 20 out of the pan 12.
9. Start again with a new litter disposal bag 14, new feces disposal bags 16 and a new quantity of litter 20.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A cat litter box with bag system comprising:
    a) a pan rectangular in shape made of rigid material comprising a bottom wall, a pair of opposite end walls extending upwardly from said bottom wall, and a pair of opposite side walls extending upwardly from said bottom wall;
    b) a litter disposal bag nested into said pan with a top edge of the litter disposal beg terminating below the top edges of the side and end walls of said pan;
    c) a plurality of feces disposal bags nested into said pan over said litter disposal bag, each of said plurality of feces disposal bags including a netting bottom wall to allow the litter to pass therethrough while trapping the feces therein and a paper peripheral wall and with the top edges of said feces disposal bags terminating below the top edges of the side and end walls of said pan; and
    d) a protective insert having an open bottom comprising a pair of opposite end panels and a pair of opposite side panels rectangular in configuration nested into said pan over said uppermost feces disposal bag, said insert having a lower slot opening at each corner where a side panel meets an end panel, said slot located adjacent bottom edges of said panels, the bottom edges of said panels resting on the bottom of the uppermost feces disposal bag, whereby when a quantity of litter is placed into said pan and used by a cat to deposit feces, said protective insert can be withdrawn and each said feces disposal bag can be removed one at a time as needed to separate the feces from the litter, then tied and discarded, so that when said litter disposal bag is reached and withdrawn it will take all of the litter out of said pan to be discarded.

2. A cat litter box with bag system as recited in claim 1, wherein said pan further includes a lip which extends around a perimeter of a top edge of said end walls and said side walls.

3. A cat litter box with bag system as recited in claim 1, wherein said litter disposal bag includes:
    a) a solid thin flexible bottom wall to hold the litter therein; and
    b) a paper peripheral wall.

4. A cat litter box with bag system as recited in claim 2, wherein said protective insert further includes a lip which extends around a perimeter of a top edge of said end panels and said side panels engaging the lip of said pan and fully enclosing the top edges of said litter and feces disposal bags.

\* \* \* \* \*